1

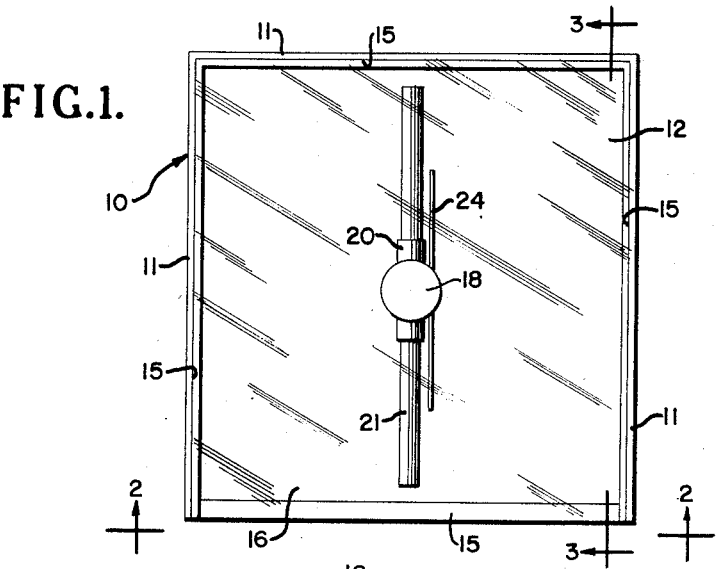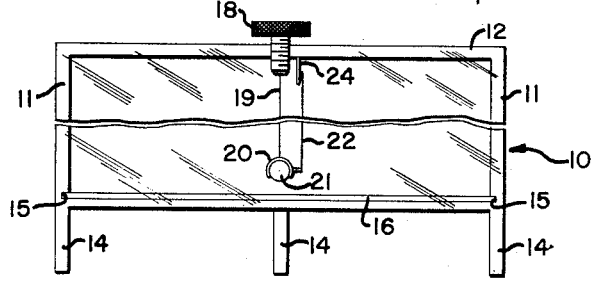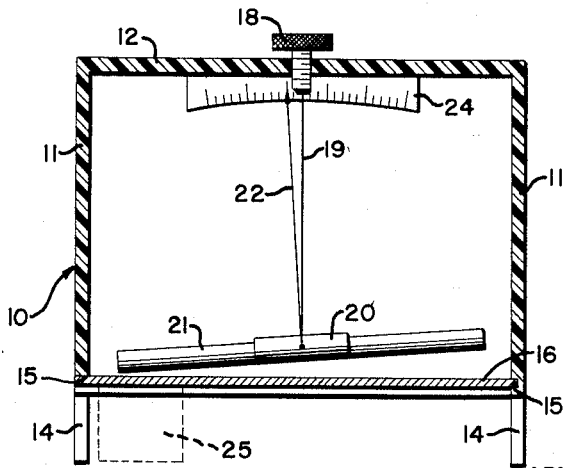

3,153,191
TEST APPARATUS HAVING A SUSPENDED PERMANENT MAGNET FOR DETERMINING MAGNETIC EFFECTS OF MATERIALS
Arthur W. Obenschain, Silver Spring, Md., and John E. Nicholson, Washington, D.C., assignors to the United States of America as represented by the Secretary of the Navy
Filed Sept. 19, 1962, Ser. No. 224,877
3 Claims. (Cl. 324—34)
(Granted under Title 35, U.S. Code (1952), sec. 266)

The invention described herein may be manufactured and used by or for the Government of the United States of America for governmental purposes without the payment of any royalties thereon or therefor.

This invention relates to magnetic test devices, and more particularly to a device for detecting the magnetic effects, if any, of substantially non-magnetic parts and materials.

In the manufacture of certain types of precision equipment, for example, magnetic fuzes for ordnance hardware, it is essential that the various components of the equipment be completely free of magnetic effects. While the solution to this problem would seem to be simply to specify non-magnetic materials for the various components, in actual practice this does not necessarily assure complete absence of magnetic effects in supposedly non-magnetic materials. Plastics and non-ferrous metals are frequently contaminated by traces of magnetic materials which may be present therein either by design or by accident. Even minute traces of magnetic materials can have detrimental effects upon the operation of precision magnetic equipment when the presence thereof is unknown and unsuspected.

In the past, various methods and apparatus have been proposed for detecting magnetic effects of supposedly non-magnetic materials. The most commonly used devices for making measurements of this type are electronic testers. These testers have been used to make permeability and magnetic effects measurements on both the materials used in the fabrication of parts and on the completed parts. There are a number of disadvantages inherent in these prior art testers. They are complex electronic instruments and thus are expensive to manufacture and have the maintenance problems normally associated with equipment of this type. Tests using these prior art testers are time consuming and usually require that the material or article to be tested be of a specified size and shape. Additionally, these testers may impose severe restrictions on the allowable magnetic background noise at the test location. The general purpose of the present invention is the provision of a sensitive magnetic test device which embodies the various advantages of prior art devices without possessing the disadvantages enumerated above.

It is therefore a primary object of the present invention to provide a new and improved magnetic test device.

It is another object of this invention to provide a magnetic test device which is inexpensive to construct and both rapid and simple in operation.

It is a further object of the present invention to provide a highly sensitive magnetic test device capable of detecting the magnetic effects of materials and articles having a permeability approaching unity.

It is yet another object of the present invention to provide a magnetic test device, the sensitivity of which may be readily varied by means of a simple adjustment.

It is yet a further object of this invention to provide a sensitive magnetic test device which may be calibrated to read directly in permeability or other suitable units.

With these and other objects in view, the present invention contemplates a magnetic test device comprising a housing having the sides and top thereof formed of transparent plastic material and the bottom thereof formed of a non-magnetic metallic plate. A bar or rod shaped permanent magnet is suspended within the housing in a position adjacent the metallic plate by means of a non-metallic filament which depends from a threaded member screwed into the top of the housing. The magnet is connected to the filament by means of a simple clamping arrangement which permits the point of suspension to be longitudinally shifted relative to the magnet to enable compensation to be made for ambient magnetic fields and the magnetic effects of nearby articles at the test location. The screw may be threaded in or out to move the magnet vertically with respect to the metallic plate and thus enable variation in the sensitivity of the device. A pointer may be secured to the clamp for movement with the magnet and cooperation with a scale mounted on the housing to indicate the amount of deflection of the magnet due to the presence of test articles beneath the metallic plate. If desired, this scale can be calibrated to read directly in terms of permeability or other desired units.

Other objects, advantages and novel features of the present invention will become readily apparent upon consideration of the following detailed description when read in conjunction with the accompanying drawings wherein:

FIG. 1 is a top plan view of a device embodying the principal features of the present invention;

FIG. 2 is an elevation view of the device of FIG. 1 looking in the direction of the line 2—2 and illustrates the suspension arrangement for the magnet; and FIG. 3 is a sectional view taken along the line 3—3 of FIG. 1 and illustrates the magnet in a deflected position due to the presence of a test object having a magnetic effect and the scale and pointer arrangement which may be used as an indication of the deflection.

Attention is directed now to the drawings, wherein like numerals of reference designate like parts throughout the several views. The testing device of the present invention comprises a housing, designated generally by the reference numeral 10, formed of four sides 11 and an integral top 12, all of transparent plastic or other suitable material. The housing 10 is provided with three legs 14 which serve to position the housing above a suitable supporting surface and enable materials or articles to be tested to be placed beneath the housing. Although the housing 10 has been illustrated as being of unitary construction for reasons of simplicity, it is readily apparent that the housing can be constructed from a plurality of individual parts assembled together in any suitable manner and in a plurality of configurations.

The sidewalls 11 are partially or completely slotted as shown at 15 to accommodate a plate 16 of aluminum or other non-magnetic metal. When the plate 16 is slid into the slots 15 to the position shown in the drawings, the housing 10 becomes a substantially air tight chamber.

An adjusting screw 18 is threaded into the top 12 and projects into the interior of the housing 10. A filament 19 of silk, nylon or non-magnetic wire is secured to the inner end of the screw 18 and has a clamp 20, of substantially semicircular configuration, fixed to the lower end thereof. A cylindrical bar or rod magnet 21 is supported by the clamp 20 and is slidable with respect thereto. A pointer 22 is rigidly fixed to the clamp 20 and cooperates with a scale 24 which depends from the underside of the top 12 to indicate the inclination of the magnet 21 and clamp 20 with respect to the horizontal.

Operation

In order that a better understanding of the invention might be had, its modes of operation will now be described. The housing is first placed upon a solid supporting surface at the desired test location. The orientation of the housing 10 is varied and the position of the clamp 20 adjusted along the magnet 21 as necessary to cause the magnet 21 to balance in the horizontal position. When this position is obtained, the device has been fully compensated for the magnet background due to ambient fields and the magnetic effects of any nearby magnetic objects. When the magnet 21 has been properly balanced, the metal plate 16 is then slid into the slots 15 to completely close the bottom of housing 10. With the housing completely closed in this manner, disturbance of the magnet due to air currents or inadvertent touching by the operator is precluded. The plate 16 also serves to prevent direct contact between any articles or materials being tested and the magnet.

An article or material sample 25 (FIG. 3) to be tested is then brought into contact with the underside of the metal plate 16 beneath one of the poles of the magnet 21. If the sample 25 contains any magnetic materials or has any magnetic effect, the magnet 21 will be deflected with the pole above the article 25 moving downward toward the plate 16. This deflection of the magnet may be observed by noting movement of the pointer 22 along the scale 24 or by observing movement of the magnet directly. If the article 25 being tested must be completely free from magnetic effects, then any deflection of the magnet will be sufficient to justify rejection of the article.

If the articles 25 being tested may have a certain predetermined maximum magnetic effect, then the device of the present invention may be readily calibrated using a standard sample which has the predetermined maximum magnetic effect. The device may be calibrated as a go-no go type of instrument by adjusting the height of the magnet 21 above the plate 16 by means of the adjusting screw 18 until the standard sample 25 deflects the magnet 21 just enough to cause the pole of the magnet to touch the plate 16. Then any sample which causes a deflection of the magnet less than this amount is acceptable whereas any sample which causes the magnet to deflect until it touches the plate 16 is rejected. Alternatively, the maximum allowable deflection caused by the standard sample may be observed on the scale 24 by the position of the pointer 22 and established as a limit of acceptability. Any sample causing a lesser deflection is acceptable while any sample causing a greater deflection is a rejectable item.

After each article 25 has been tested, it is removed from beneath the plate 16. If the article 25 has caused the magnet 21 to deflect, the magnet then tends to resume its preset horizontal position. Normally the magnet 21 would tend to oscillate until air resistance within the housing 10 has damped out the oscillations. However, since the plate 16 is metallic and hence a conductor of electricity, movement of the magnet 21 towards the horizontal position induces eddy currents within the plate 16. As is well known to those skilled in the art, the direction of these eddy currents will be such as to create a magnetic field opposing the movement of the magnet 21 which induced the currents. Thus the oscillations of the magnet 21 are rapidly damped out and the magnet will quickly come to rest in its horizontal position. This damping effect will also take place should the magnet 21 be set into motion in any direction by any other cause such as an inadvertent jarring of the housing 10. This automatic damping is the primary reason why the bottom of the housing 10 is formed of metal rather than of the same material as the top and sides thereof which are essentially non-conductors.

A test device constructed in accordance with the present invention has demonstrated a truly remarkable sensitivity. In the test device, an Alnico V magnet having a strength of approximately 12,500 gauss was suspended within a clear plastic housing by means of a nylon filament. The magnet was ¼ inch in diameter and 4 inches long and was spaced approximately 1/16 inch from a 1/8 inch thick aluminum plate. Various sample articles having a measured permeability in the range 1.005 to 1.010 deflected either pole of the magnet into contact with the aluminum plate. As will be readily apparent to those skilled in the art, the stated permeability range is about the limit of sensitivity of the usual electronic tester.

From the foregoing it will be readily apparent that the present invention provides numerous advantages not to be found in the prior art devices. The test device of this invention is simple and inexpensive to construct and with it magnetic tests may be made rapidly and involve only the employment of simple techniques. Also, the test device of this invention imposes essentially no limitations on the ambient magnetic background or the nature of various nearby objects since these conditions can be compensated for through orientation of the housing and the position of the clamp along the magnet. Further, the sensitivity of the present test device may be widely varied through the simple expedient of changing the spacing between the magnet and metal plate by means of the adjusting screw. Finally, the present invention may be used to perform various types of magnetic tests by providing appropriate calibrations, such as permeability, on the scale.

It is to be understood that the aforedescribed arrangement is simply illustrative of a preferred embodiment of the present invention. Numerous other arrangements may be readily devised by those skilled in the art to achieve similar embodiments which incorporate the principles of the present invention and fall within the spirit and scope thereof.

What is claimed is:

1. A device for detecting magneitc effects in substantially non-magnetic articles comprising a transparent plastic housing having closed sides and top and an open bottom, a non-magnetic metal plate slideably mounted on the bottom of said housing for closing the opening therein, a non-magnetic screw threaded into the top of said housing and projecting into the interior thereof, a non-metallic filament secured to the inner end of said screw, a bar magnet, adjustable means suspending said bar magnet from said filament adjacent said plate for enabling shifting of the point of suspension longitudinally of said magnet to facilitate compensation for ambient magnetic fields, said non-magnetic screw enabling movement of said magnet toward and away from said plate to vary the sensitivity of said device, and a pointer fixed to said magnet and aligned with a scale mounted on said top of said housing and contained within said housing for indicating deflection of said magnet relative to said metallic plate.

2. A device for detecting magnetic effects in substantially non-magnetic articles comprising a transparent plastic housing having closed sides and top and an open bottom, a non-magnetic metal plate slideably mounted on the bottom of said housing for closing the opening therein, a non-magnetic screw threaded into the top of said housing and projecting into the interior thereof, a non-metallic filament secured to the inner end of said screw, a bar magnet, adjustable means for suspending said bar magnet from said filament adjacent said plate, said adjustable means enabling shifting of the point of suspension longitudinally of said magnet to faciltate compensation for ambient magnetic fields, and a plurality of legs mounted on the sides of said housing adjacent the bottom thereof and extending downwardly therefrom for positioning said housing above a supporting surface in spaced relation thereto to facilitate disposition of articles to be tested between the bottom of said housing and said supporting surface beneath one of the poles of said magnet and adjacent said plate whereby the presence of magnetic materials in said articles is indicated by the deflection of said one pole toward said plate, said non-magnetic screw enabling movement of said magnet toward and away from said plate to vary the sensitivity of said device.

3. A device as defined in claim 2 wherein a pointer is fixed to said adjustable suspending means and cooperates with a scale mounted on said housing to indicate deflection of said magnet relative to said metallic plate.

References Cited in the file of this patent

UNITED STATES PATENTS

| | | |
|---|---|---|
| 401,428 | Gipperich | Apr. 16, 1889 |
| 1,310,443 | Robinson | July 22, 1919 |
| 2,749,663 | Lemelson | June 12, 1956 |
| 2,750,561 | Gross | June 12, 1956 |
| 2,760,154 | Haalck | Aug. 21, 1956 |
| 2,775,736 | Pies | Dec. 25, 1956 |
| 3,024,412 | Breen | Mar. 6, 1962 |